Jan. 15, 1924. Re. 15,747

J. A. WHERRY

COLLATING DEVICE FOR TYPEWRITERS AND ADDING MACHINES

Original Filed April 10, 1919 2 Sheets-Sheet 1

Inventor
John A Wherry
by B B Stickney
Attorney

Jan. 15, 1924. Re. 15,747

J. A. WHERRY

COLLATING DEVICE FOR TYPEWRITERS AND ADDING MACHINES

Original Filed April 10, 1919 2 Sheets-Sheet 2

Inventor
John A. Wherry
by B. B. Stickney
Attorney

Reissued Jan. 15, 1924. Re. 15,747

UNITED STATES PATENT OFFICE.

JOHN A. WHERRY, OF NEW ORLEANS, LOUISIANA, ASSIGNOR TO UNDERWOOD TYPEWRITER COMPANY, OF NEW YORK, N. Y., A CORPORATION OF DELAWARE.

COLLATING DEVICE FOR TYPEWRITERS AND ADDING MACHINES.

Original No. 1,336,453, dated April 13, 1920, Serial No. 289,120, filed April 10, 1919. Application for reissue filed June 4, 1921. Serial No. 475,121.

*To all whom it may concern:*

Be it known that I, JOHN A. WHERRY, a citizen of the United States, residing at New Orleans, in the parish of Orleans, in the State of Louisiana, have invented certain new and useful Improvements in Collating Devices for Typewriters and Adding Machines; and I do hereby declare the following to be a full, clear, and exact description of the invention, such as will enable others skilled in the art to which it appertains to make and use the same.

This invention relates to a collating device for typewriters and adding machines, and particularly to typewriting machines without the adding features, wherein a revoluble platen is used for ledger posting and statement work.

More particularly, the invention relates to machines, of the above character, in which there are provided sheet-holding clamps or clips at the collating board, which are so shaped and operated that they may lie between the sheets when holding the same, but may be released therefrom without, as heretofore, being swung up or lifted out of the collated body of sheets, and without involving the objectionable bending up and frequent tearing of the sheet edges involved in such former swinging and lifting movements, and in which the clamps preferably are of thin, flat sheet-metal, so that, although they interpose between the edges of the sheets, parallel to the board, the sheet edges lie substantially flat, one over the other; and the releasing movement of the clamps is a lifting of the same just sufficient to relieve the pressure thereof on the sheets, while maintaining the clamps in their parallel relation to the board and sheets. In such a machine, the clamps are preferably positioned, one or more, on each side of the board, and gages for the sides of the sheets are used as integral parts of the clamp-supports.

The objects of the invention are to provide, in mechanism of the character mentioned, means for holding the clamps in their released and effective positions; means for holding the clamps, independently of each other, in either released or effective position; means for releasing the clamps separately or simultaneously; and means for automatically throwing one or more of the clamps to effective position. Otherwise stated, the invention has for its objects mechanism to permit of convenient handling and collation of the work-sheets, in that the operator need be concerned with but one clamp at a time as he successively places the sheets, and, when the collation is complete (and held, as by the feed-rolls to the platen), may release all the clamps simultaneously, the clamps thereupon being held in released position without further attention on the part of the operator while the collation is line-fed on the platen, and until the operation of again setting the clamps, one by one, at the next collation. In operation, with the clamps all released, and held or locked in released position, the proof-sheet, or other first sheet, is inserted under all such clamps as project into its field; and one of these clamps is then depressed and locked down to hold that sheet. Another sheet is then positioned over the depressed flat clamp, but under those of the remaining released clamps which project into its field; and another of the clamps is depressed and locked down to hold the second sheet. The clamps are thus successively brought into play, and, when the collation is complete and the collated sheets are held, as by application of the feed-rolls to the platen, the clamps are thrown preferably simultaneously to their releasing position, where they are locked, so as to permit the sheets to be withdrawn lengthwise, as a unit, from the interleaving clamps.

In a general sense, the object of the invention resides in the provision of a collating device on which the work-sheets may be assembled or collated and carried to the printing position on the typewriter or on the adding machine without disarrangement.

Further objects will appear as the description progresses and I, therefore, do not deem it necessary to point out those objects here in detail.

Figure 1:
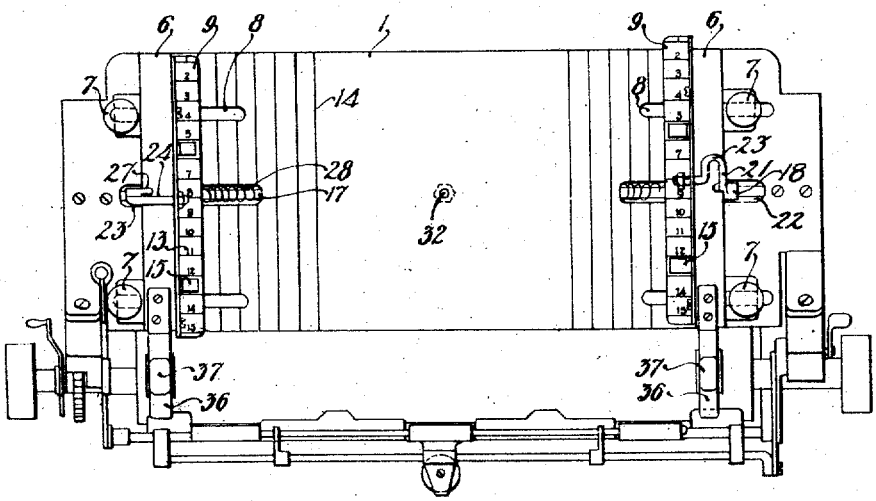
Figure 1 is a front elevation of one embodiment of my device, showing the same in place on a portion of a typewriter-carriage.
Figure 6:
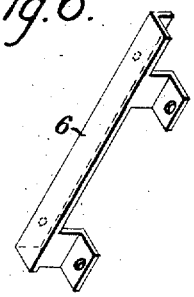
Figure 6 is a perspective view of the bracket for supporting one of the sheet-alining and clamping devices.
Figure 2:
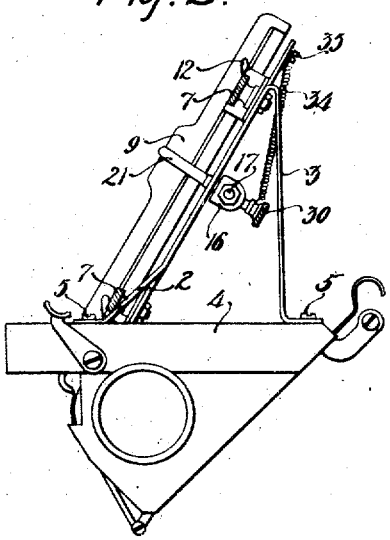
Figure 2 is a side elevation of the same.
Figure 3:
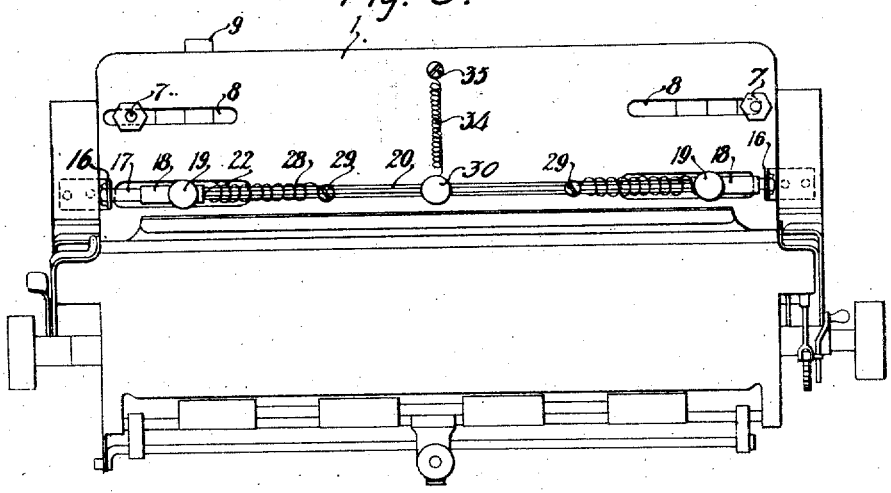
Figure 3 is a rear elevation thereof.

The collating board 1 is formed of a single sheet of metal, from which integral front and rear supporting standards 2 and 3 extend. These standards are struck from the same material from which the body of the board is formed. The standards 2 and 3 are secured to the inner carriage ends 4 by suitable fasteners 5. The material of the standards 2 and 3 is preferably pliable so that the angle of inclination of the body of the board may be changed by merely changing the relative angles of the standards. In applying the board to the inner carriage ends in the manner described, it is not necessary to remove the paper-fingers, brackets and bracket-rod of the carriage as they may be turned up before the board is mounted on the cover-plates, so as to rest in back of the board itself. The paper-fingers, brackets and bracket-rod of the typewriter-carriage are not illustrated in the drawings, as they form no part of the invention. A pair of elongated brackets 6 are mounted on the front face of the board 1 and are adjustable transversely thereof. These brackets are held in their adjusted positions by suitable binding screws 7 which extend through slots 8 in the board 1, as clearly illustrated in the drawings. Thus, the brackets may be moved to or away from each other and the clamping screws 7 tightened. These brackets 6 carry the movable sheet-clamps 9, their movement being permitted by slots 10 through which the guide-screws 11 extend from the brackets 6.

Figure 5:
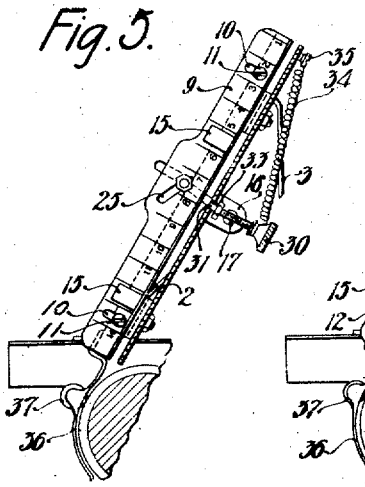
Figure 5 is a similar view of a modified form.
Figure 4:
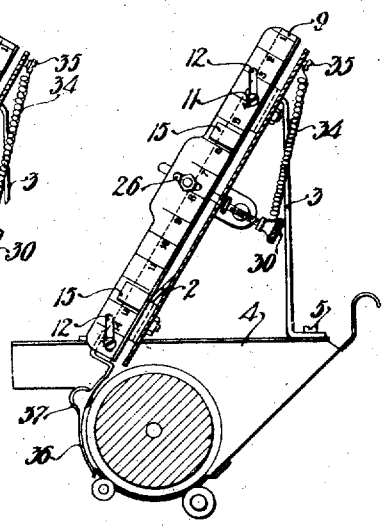
Figure 4 is a vertical sectional view.

In the form of the invention illustrated in Figure 5, the slots 10 extend transversely of the angular sheet-clamps 9, while, in the form illustrated in Figure 4 of the drawings, the slots which are designated by the reference character 12 extend diagonally. These sheet-clamps 9 are of angular form, similar to those described in my Patent No. 1,320,593, dated November 4, 1919, and are provided with graduations 13, the collating board 1 being provided with lines 14. The angular clamping members 9 also have sheet-retaining springs 15 thereon.

In order that the sheet-clamps 9 may be simultaneously or separately moved into or out of clamping relation, I have provided a pair of brackets 16 which are attached to the rear face of the board 1, and revolubly support a rod 17. Sleeves 18 are mounted so as to have rotation and longitudinal movement relative to the rod. The sleeves, however, are adapted to be clamped against relative rotative movement by thumb-screws 19, which extend into a longitudinal groove 20 in the rod and thus prevent the relative rotative movement, but permit the longitudinal movement of the sleeves. Extending from the sleeves 18 are rock-arms 21 which project through slots 22 in the board, which slots are parallel with the aforementioned slots 8. These rock-arms are provided with goose-neck portions 23 and with rectilinear portions 24, which extend through slots 25 in the upwardly-extending webs of the angular sheet-clamps. The slots 25 in the form illustrated in Figure 5 are arranged diagonally, while the corresponding slots 26 in the form illustrated in Figure 4 are arranged perpendicular to the bases of the sheet-clamps. Thus, when the sleeves 18 are rotated either simultaneously or separately, the rock-arms 21 will move the sheet-clamps 9 to or away from the collating board. These sheet-clamps will be held away from said board by the engagement of the rock-arms 21 in notches 27, which are formed in the edges of the brackets or guides 6.

A pair of coil-springs 28 encircle the rod 17, and each is attached at one of its ends to the adjacent thumb-screw 19 and at its other end to a fastener 29 which is secured to the rod. The tendency of these springs is to pull the sheet-clamps toward the center of the collating board or toward each other, and thus they will serve to retain the rock-arms 21 in the notches 27 when they are so engaged.

The springs 28 further operate to force the sheet-clamps 9 into engagement with the sheets or collating board so as to clamp the sheets in their proper positions.

Intermediate the ends of the rod 17, a thumb-screw 30 is mounted. This thumb-screw extends completely through the rod in threaded engagement therewith, and has a bill portion 31, which is adapted to be projected into an opening 32 in the board. A lock-nut 33 is located on this thumb-screw 30 to prevent the operation of the screw to such an extent that it will be disengaged from the rod when it is moved in one direction and that the bill 31 will project beyond the working surface of the board 1. A coil-spring 34 is attached to the thumb-screw 30 at one of its ends and at its other end to a suitable fastener 35 adjacent to the upper edge of the board 1. The tendency of this spring is to rotate the rod 17.

Mounted on and extending downwardly from the brackets 6, are fingers 36 which have feed-rollers 37 thereon.

When the thumb-screws 19 are adjusted inwardly so as to prevent the relative rotation of the sleeves 18 on the rod 17, the sleeves will be free to move inwardly under the action of the springs 28, but will rotate in unison upon the rotation of the rod 17. This rod is prevented from rotating by the engagement of the bill 31 of the thumb-screw 30 in the opening 32 in the collating board 1, but it is permitted to rotate, under the influence of the spring 34, when said screw 30 is backed off sufficiently to disengage the bill 31 from the hole 32. When the adjustments above described are made, both of the sheet-clamps 9 will be swung in unison toward the board by the spring 34 and they may be moved away from the board in unison, as will be understood. When the sheet-clamps are in their raised position and are held in this position by the engagement of the rock-arms 21 in the notches 27, the clamps may again be permitted to swing toward the board by simply manually disengaging the rock-arms from the notches. When, however, either one of the thumb-screws 19 is backed off to permit the sleeve in which it is mounted to rotate with relation to the rod 17, the above-described action will be confined to the other sleeve. Of course, by the adjustments described, it is possible to raise either or both of the sheet-clamps to permit the insertion of the sheets beneath the same. When the screws 19 are adjusted so that the collars 18 are free to rotate on the shaft 17, this shaft is held stationary by the engagement of the bill 31 in the hole 32 of the collating board.

Work-sheets which are usually used in collating have column-lines thereon and the number of the alining lines are usually numbered. While it is not necessary to have the column-lines and the numbering on the work-sheets, it facilitates the use of my invention.

In operation, the brackets 6 with the alining and sheet-clamping elements 9 thereon are adjusted to the proper distance apart for the particular sheets to be collated and are alined at right angles to the printing position on the platen by the use of lines 14 on the board 1. The clamps 9 are then raised and remain raised by engagement of the rock-arms 21 in the notches 27. The first work-sheet is fed into the typewriter or into the adding machine in the usual way, so that the forward end is above the feed-rollers of the collating board, being guided on the board by the fingers and rollers. The feed-rollers of the typewriter are then released and the work-sheet is held in position on the platen and on the collating board by rollers 37. The work-sheet is then advanced or retired by means of the feed-rollers 37. This feeding is brought about by turning the platen-knob of the typewriter or adding machine. The tension of the fingers 36 is just sufficient to keep the feed-rollers in proper position to perform their function and as this is true the work-sheet can be easily shifted so that it can be alined at right angles to the printing position on the platen by the cross-lines always under the heading on ledger-sheets and statements. By placing the cross-line on the ledger-sheet under one of the graduating lines on clamps 9, the first printing position of a line on a work-sheet is alined by one of the edges of clamps 9. This first work-sheet is held in position by feed-rollers 37 of the collating board, and not by clamps 9. The clamps 9 are still raised from the board. When column-lines about $\frac{3}{4}$ of an inch from the side edges are on the work-sheet and the alining lines on the work-sheet are numbered, the first sheet is alined at right angles to the printing position on the platen by shifting the work-sheet so that a column-line thereon is parallel with the edge of one of the angular clamps 9 and the printing position on the work-sheet is moved so that it is in line with one of the numbered lines on the angular clamp 9. This first sheet is held in position by the feed-rollers 37 of the collating board and not by clamps 9; the clamps 9 are still raised from the board, and, bearing in mind that the feed-rollers of the typewriter or adding machine are still lowered from the platen, a second work-sheet with a sheet of carbon is inserted around the platen by hand so that the carbon-paper is in proper position between the work-sheets. The second work-sheet does not pass under the fingers 36 with the feed-rollers 37, but is alined and placed in proper position on the first sheet in the same manner as the first sheet is placed in position on the collating board and is held in position by hand, then one or both of the clamps 9 are lowered, clamping the second sheet in proper position on the first sheet. If a third sheet is used, it is assembled in the same manner on the second sheet with carbon-paper, the second sheet is then held in position by only one of the clamps 9 and the opposite clamp from the one holding the second sheet is used to clamp the third sheet that has been placed in proper position on the second work-sheet. The fourth work-sheet with the carbon-paper is inserted in the same way, the side edge is placed in the angle of clamp 9, the work-sheet is alined with the other sheets by one of the graduating lines on clamps 9 and is held in position by spring-clamps 15 on either of the alining clamps 9. Of course, other work-sheets can be alined in the same manner as the fourth work-sheet. The feed-rollers of the typewriter or adding machine are then raised to clamp the work-sheets to the platen and the work-sheets are slipped out from under the clamps 15 and the sheet-clamps 9 are raised to release the sheets from the collating board. The work-sheets may now be turned down to the proper position on the typewriter and the operator may proceed with the printing.

Variations may be resorted to within the scope of the invention, and portions of the improvements may be used without others.

Having thus described my invention, I claim:

1. In a machine of the class described, the combination with a rotatable platen and a traveling carriage, of a collating board associated therewith, said board having deformable supporting standards, whereby the angle of inclination and the distance of the lower edge of the board from the platen may be varied.

2. In a machine of the class described, the combination with a rotatable platen and a traveling carriage, of a collating board, a sheet clamp and alining member extending longitudinally of the board mounted to move toward and away from the board and adapted to engage the edges of the sheets to aline the same, and to clamp the sheets against the face of the board, and means tending to move the member toward the board.

3. In a machine of the class described, the combination with a rotatable platen and a traveling carriage, of a collating board, a sheet clamp and alining member extending longitudinally of the board mounted to move toward and away from the board and adapted to engage the edges of the sheets to aline the same and to clamp the sheets against the face of the board, and resilient means tending to move the member toward the board.

4. In a machine of the class described, the combination with a rotatable platen and a traveling carriage, of a collating board, a sheet clamp and alining member extending longitudinally of the board mounted to move toward and away from the board and adapted to engage the edges of the sheets to aline the same and to clamp the sheets against the face of the board, resilient means tending to move the member toward the board, and means for preventing such movement.

5. In a machine of the class described, the combination with a rotatable platen and a traveling carriage, of a collating board, a pair of sheet clamp and alining members extending longitudinally of the board movable toward and away from the board and adapted to engage the edges of the sheets to aline the same and to clamp the sheets against the face of the board, and means for moving said members simultaneously toward the board.

6. In a machine of the class described, the combination with a rotatable platen and a traveling carriage, of a collating board, a pair of sheet clamp and alining members movable to and away from the board, means for moving said members simultaneously toward the board, and means for moving said members independently toward the board.

7. In a machine of the class described, the combination with a rotatable platen and a traveling carriage, of a collating board, a pair of sheet clamp and alining members extending longitudinally of the board, movable toward and away from the board and adapted to engage the edges of the sheets to aline the same and to clamp the sheets against the face of the board, and resilient means for moving said members simultaneously toward the board.

8. In a machine of the class described, the combination with a rotatable platen and a traveling carriage, of a collating board, a pair of sheet clamp and alining members movable to and away from the board, means for moving said members simultaneously toward the board, and resilient means for moving said members independently toward the board.

9. In a machine of the class described, the combination with a rotatable platen and a traveling carriage, of a collating board, a pair of sheet clamp and alining members movable to and away from the board, means for moving said members simultaneously toward the board, means for moving said members independently toward the board, and means for maintaining either of said members in its raised position.

10. In a machine of the class described, the combination with a rotatable platen and a traveling carriage, of a collating board, sheet clamp and alining members mounted for movement to and away from the board, a rotatable rod, sleeves rotatably mounted on the rod, rock arms extending from the sleeves and connected with the members, means adapted to rotate the sleeves on the rod, means for securing the sleeves to the rod, and means for rotating the rod.

11. In a machine of the class described, the combination with a rotatable platen and a traveling carriage, of a collating board, sheet clamp and alining members mounted for movement to and away from the board, a rotatable rod, sleeves rotatably mounted on the rod, rock arms extending from the sleeves and connected with the members, means adapted to rotate the sleeves on the rod, means for securing the sleeves to the rod, means for rotating the rod, and means for preventing the rotation of the rod.

12. In a machine of the class described, the combination with a rotatable platen and a traveling carriage, of a collating board, sheet clamp and alining members mounted for movement to and away from the board, a rotatable rod, sleeves rotatably mounted on the rod, rock arms extending from the sleeves and connected with the members, resilient means adapted to rotate the sleeves on the rod, means for securing the sleeves to the rod, and means for rotating the rod.

13. In a machine of the class described, the combination with a rotatable platen and a traveling carriage, of a collating board, sheet clamp and alining members mounted for movement to and away from the board, a rotatable rod, sleeves rotatably mounted on the rod, rock arms extending from the sleeves and connected with the members, means adapted to rotate the sleeves on the rod, means for securing the sleeves to the rod, and resilient means for rotating the rod.

14. A collating device including a board, brackets mounted thereon, sheet clamping and alining members carried by the brackets extending longitudinally of the board movable toward and away from the board and adapted to engage the edges of the sheets to aline the same and to clamp the sheets against the face of the board, and resilient means for moving said members toward the board.

15. A collating device including a board, brackets mounted thereon, sheet clamping and alining members carried by the brackets extending longitudinally of the board, movable toward and away from the board and adapted to engage the edges of the sheets to aline the same and to clamp the sheets against the face of the board, and resilient means for simultaneously moving said members toward the board.

16. A collating device including a board, brackets mounted thereon, sheet clamping and alining members carried by the brackets and capable of moving to and away from the board, resilient means for moving said members toward the board, and means for selectively moving said members toward the board.

17. A collating device, including a board, brackets mounted on said board, sheet clamping and alining members mounted on the brackets for movement to and away from the board, means for moving the members toward the board, and notches in the brackets engageable with the last-mentioned means for preventing the movement of the members toward the board.

18. A collating device, including a board, brackets mounted on said board, sheet clamping and alining members mounted on the brackets for movement to and away from the board, means for moving said members toward the board, notches in the brackets engageable with the last-mentioned means for preventing the movement of the members toward the board, and means normally tending to engage the aforementioned means in said notches.

19. A collating device including a board, brackets adjustable to and away from each other, sheet clamping and alining members carried by the brackets and capable of movement to and away from the board, a rod rotatably mounted on the rear side of the board, sleeves rotatably and slidably mounted on the rod, rock arms connected to the sleeves and to said members, and means tending to rotate the sleeves to cause said members to move toward the board, said means also tending to move the sleeves longitudinally on the rod, said brackets having notches therein in which the rock arms engage under the influence of the aforementioned means.

20. A collating device including a board, sheet clamping and alining members mounted thereon and movable to and away from the same, a rod mounted on the rear side of the board, rock arms extending from the rod and connected with said members, means tending to rotate the rod, and means for controlling said rotation.

21. In a machine of the class described, the combination with the rotatable platen, of a collating board associated therewith, brackets mounted on the board, clamping and alining members supported by said brackets and movable toward and away from said board, and feed rollers supported by the brackets arranged to bear on the platen and adapted to hold work-sheets in position on the platen and the collating board when the platen feed rollers have been released.

22. In a typewriting machine, in combination, a platen, a collating-board, a plurality of sheet-clamping devices protruding over the sheet field on the board in both their released and effective positions and independently movable vertically down to and up from the board between the released and effective positions, and manually-controlled means for holding the clamps in the released position.

23. In a typewriting machine, in combination, a platen, a collating-board, a plurality of sheet-clamping devices protruding over the sheet field on the board in both their released and effective positions and independently movable vertically down to and up from the board between the released and effective positions, and manually-controlled means for holding the clamps in the effective position.

24. In a typewriting machine, in combination, a platen, a collating board, a plurality of sheet-clamping devices protruding into the sheet field on the board, one of said clamping devices, when in clamping position, being substantially parallel to the board, so as to be adapted to lie between an under sheet, held by it, and an upper sheet held by another of said clamping devices, means for releasing said parallelly disposed clamp, and means for determining a released position thereof in which it remains protruded into the sheet field, substantially parallel to the board, and in which it may be maintained between the sheets thus collated.

25. In a typewriting machine, in combination, a platen, a collating board, a plurality of sheet-clamping devices protruding into the sheet field on the board, one of said clamping devices, when in clamping position, being substantially parallel to to the board, so as to be adapted to lie between an under sheet, held by it, and an upper sheet held by another of said clamping devices, means for releasing said parallelly disposed clamp, means for determining a released position thereof in which it remains protruded into the sheet field, substantially parallel to the board, and in which it may be maintained between the sheets thus collated, means whereby said parallelly disposed clamp may be held in its aforesaid released position, and means for automatically throwing the same from such released position to its effective position when it is freed of such hold thereon.

26. In a typewriting machine, in combination, a platen, a collating board, a plurality of sheet-clamping devices protruding into the sheet field on the board, one of said clamping devices, when in clamping position, being substantially parallel to the board, so as to be adapted to lie between an under sheet, held by it, and an upper sheet held by another of said clamping devices, means for releasing said parallelly disposed clamp, means for determining a released position thereof in which it remains protruded into the sheet field, substantially parallel to the board, and in which it may be maintained between the sheets thus collated, means for automatically returning said parallelly disposed clamp from its aforesaid released position to its effective position, and means for locking the clamp against such automatic return.

27. In a typewriting machine, in combination, a platen, a collating board, a plurality of sheet-clamping devices protruding into the sheet field on the board, one of said clamping devices, when in clamping position, being substantially parallel to the board, so as to be adapted to lie between an under sheet, held by it, and an upper sheet held by another of said clamping devices, means for releasing said parallelly disposed clamp, means for determining a released position thereof in which it remains protruded into the sheet field, substantially parallel to the board, and in which it may be maintained between the sheets thus collated, and means for simultaneously releasing both of the sheet-clamping devices.

28. In a typewriting machine, in combination, a platen, a collating board, and a plurality of superposed sheet-clamping devices adapted to be pressed together to hold a sheet therebetween, and means for moving the under of said clamps to and from the board to clamp and release a sheet between the same and the board.

29. In a typewriting machine, in combination, a platen, a collating board, a plurality of superposed sheet-clamping devices adapted to be pressed together to hold a sheet therebetween, and means for moving the under of said clamps to and from the board to clamp and release a sheet between the same and the board, and means for simultaneously releasing both of said clamps.

30. In a typewriting machine, in combination, a platen, a collating board, and a plurality of superposed sheet-clamping devices adapted to be pressed together to hold a sheet therebetween, and means for moving the under of said clamps to and from the board to clamp and release a sheet between the same and the board, and the upper of said clamps being movable with respect to the lower clamp when the latter is in effective position; so that, after a sheet is clamped by the lower clamp, another sheet may be inserted, and clamped, between the two clamps.

31. In a typewriting machine, in combination, a platen, a collating board, a plurality of superposed sheet-clamping devices adapted to be pressed together to hold a sheet therebetween, the under of said clamps being movable to and from the board to clamp and release a sheet between the same and the board, and means for determining a released position of the lower clamp in which it remains over the sheet field and is substantially parallel to the board, so as to remain between the two sheets without undue bending of the edge of the upper sheet when released.

32. In a typewriting machine, in combination, a platen, a collating board, and a plurality of superposed sheet-clamping devices adapted to be pressed together to hold a sheet therebetween, and means for moving the under of said clamps to and from the board to clamp and release a sheet between the same and the board, and said under clamp being movable to release the lower sheet without releasing the sheet held between the clamps.

33. In a typewriting machine, in combination, a platen, a collating board, and a plurality of superposed sheet-clamping devices adapted to be pressed together to hold a sheet therebetween, and means for moving the under of said clamps to and from the board to clamp and release a sheet between the same and the board, and said under clamp being movable to clamp the lower sheet without releasing the sheet held between the clamps.

34. In a typewriting machine, a clamp, an element with which one side of the clamp co-operates to hold a sheet in adjusted position thereagainst, a second clamp abutting the other side of the first clamp for holding a second sheet between the two clamps, over the first sheet, and means for setting and releasing the first mentioned clamp.

35. In a typewriting machine, a clamp, an element with which one side of the clamp co-operates to hold an under sheet in adjusted position thereagainst, a second clamp abutting the other side of the first clamp for holding a second or upper sheet between the two clamps, over the first sheet, and means for setting and releasing the first clamp to release the under sheet without releasing the upper sheet.

JOHN A. WHERRY.

Witnesses:
ST. CLAIR ADAMS,
J. N. SWING.